United States Patent [19]

Chouings

[11] 3,951,243
[45] Apr. 20, 1976

[54] TORQUE LIMITATION DEVICE FOR A DRUM BRAKE

[76] Inventor: Leslie Cyril Chouings, Holly Croft, Bourton, near Rugby, Warwickshire, England

[22] Filed: Feb. 24, 1975

[21] Appl. No.: 552,107

[30] Foreign Application Priority Data
Feb. 28, 1974  United Kingdom.................. 9197/74

[52] U.S. Cl................................ 188/328; 188/331
[51] Int. Cl.$^2$........................................ F16D 51/20
[58] Field of Search ........... 188/325, 328, 329, 331, 188/332, 341

[56] References Cited
UNITED STATES PATENTS

| | | | |
|---|---|---|---|
| 2,246,242 | 6/1941 | Chase ................................. | 188/331 |
| 3,420,340 | 1/1969 | Hopf................................... | 188/331 |
| 3,805,926 | 4/1974 | Clay et al............................ | 188/331 |

FOREIGN PATENTS OR APPLICATIONS

| | | | |
|---|---|---|---|
| 920,591 | 10/1954 | Germany........................... | 188/328 |
| 966,206 | 10/1950 | France................................ | 188/328 |
| 1,024,633 | 4/1953 | France................................ | 188/331 |

*Primary Examiner*—Trygve M. Blix
*Assistant Examiner*—Edward R. Kazenske
*Attorney, Agent, or Firm*—Owen, Wickersham & Erickson

[57] ABSTRACT

A drum brake, primarily for a trailer, which gives normal braking torque in forward direction and low torque in reverse. This is achieved by having a pivoted lever acting between the one ends of two shoes remote from the ends between which the brake actuator is located. The shoes act on the lever at different effective radii and the forces applied by the shoes to the lever hold it in a first position during forward rotation, thus allowing normal braking torque, and a second position during reverse rotation which allows the ends of the shoes acted on by the actuator to move apart thus allowing a limitation of the reverse braking torque by limiting the stroke of the actuator.

8 Claims, 4 Drawing Figures

TORQUE LIMITATION DEVICE FOR A DRUM BRAKE

BACKGROUND OF THE INVENTION

1. Field of the Invention

This invention relates to internal, expanding drum brakes particularly for use on trailers.

For a trailer it is desirable to make a brake operate so that the braking torque when the drum is rotating in one direction is much lower than it is when the drum is rotating in the other direction. For example, a trailer brake operated by an overrun mechanism will lock-up if the trailer is reversed up a steep gradient. It is therefore desirable to provide a trailer brake which will produce a low braking torque in reverse but full braking torque when operated during forward movement. Such trailer brakes are already known.

2. Description of the Prior Art

For example it is known to have compound shoes each comprising an inner and an outer part which are relatively movable, the inner parts being operated upon by the actuator and the outer parts carrying the brake linings. During forward rotation the shoes act normally but during reverse rotation the outer parts are moved relative to the inner parts by the reactive forces on the linings and the effective diameter of the shoes is decreased thus requiring a greater movement of the actuator to obtain a given braking torque.

It is also known to have a spring-loaded member associated with one of the brake shoes and which moves against its spring loading during reverse movement to prevent the shoe with which it is associated from providing effective braking torque.

It is an object of the invention to provide an improved brake which is particularly suitable for trailers and which will give full braking torque in forward movement but will give a low torque in reverse due to changes in the reactive forces of the shoes but which may be operated to give full torque by a parking brake without the necessity of having to overcome very strong spring-loading.

SUMMARY OF THE INVENTION

According to the invention, therefore, I provide a drum brake comprising a drum, two shoes mounted within the drum for movement between operative and inoperative positions, spring means biasing the shoes to their inoperative positions, a shoe actuator interposed between adjacent one ends of the two shoes, a shoe abutment and torque limitation means arranged to provide a clearance having a predetermined value when the shoes are in their operative positions and the drum is rotating in one direction and to eliminate or substantially to eliminate said clearance in response to the reactive forces generated by the shoes due to their engagement with the drum when the shoes are in their operative positions and the drum is rotating in the opposite direction whereby, when the drum is rotating in said opposite direction, a greater movement apart is required of said one ends of the shoes from the positions said ends occupy when the shoes are in their inoperative positions to obtain a given braking torque than is required to obtain said braking torque when the drum is rotating in the one direction and; the torque limitation means being arranged so that, with the drum rotating in either of said directions and with the shoes in their operative positions, said reactive force generated by one of the shoes acts to tend to reduce said clearance; characterised in that the torque limitation means comprises a lever mounted to pivot with respect to a fixed part of the brake and being engaged, either directly or through connecting means, with the other ends of the shoes, the engagement of the lever with said shoe ends being at different radii about the lever pivot for the two shoe ends, the lever being biased to a rest position which it takes up when the shoes are in their inoperative positions, whereas when the shoes are in their operative positions said reactive forces (1) hold the lever substantially in its rest position when the drum is rotating in said one direction and (2) pivot the lever to eliminate or substantially eliminate the clearance when the drum is rotating in said opposite direction.

The shoes can be arranged to act respectively in a leading and trailing sense or the shoes may be arranged as a duo-servo brake.

First and second brake operating means may be provided for the brake together with disabling means which is operable when the second operating means is operated to prevent pivoting of the lever. In a trailer, the first operating means would be the normal overrun brake operating means and the second operating means would be the parking brake.

BRIEF DESCRIPTION OF THE DRAWING

The invention will now be described in detail by way of example with reference to the accompanying drawings in which.

DESCRIPTION OF THE PREFERRED EMBODIMENTS

Figure 2:
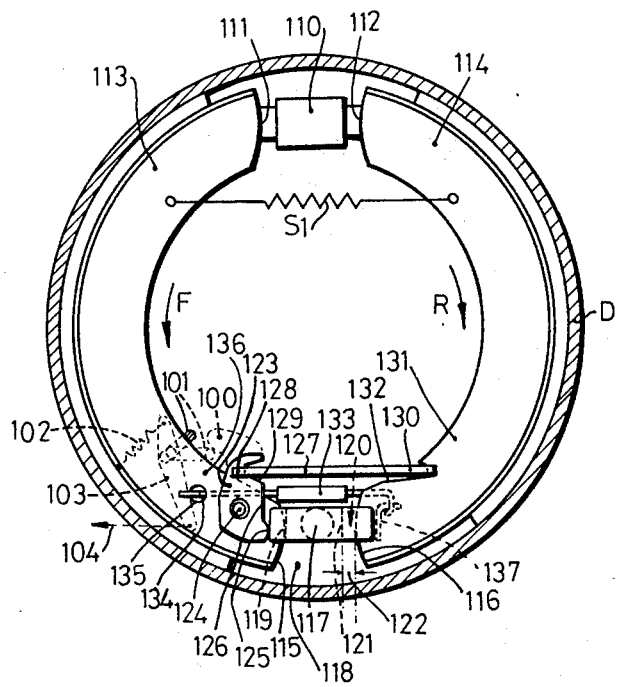
FIG. 2 is an elevation of the drum shoes and torque limitation means of a leading and trailing shoe brake constituting a first embodiment of the invention.

Referring first to FIG. 2, the brake comprises a floating actuator 110 which engages between the one ends 111 and 112 of brake shoes 113 and 114 respectively. The other ends of the shoes 113 and 114 are indicated at 115 and 116 and are associated with an abutment 117 which is secured to the brake back plate 118. The ends of the abutment are slotted, thus there is a first slot 119 in which is received the end 115 of the shoe 113, the end abutting the base of the slot. There is a slot 120 at the other end of the abutment having a base 121 from which, in the position of the shoes shown in FIG. 2, the end 116 of the shoe 114 is spaced by a clearance 122.

A lever 123 is pivoted to the shoe 113 about a pin 124 which provides a fixed pivot axis, the pin 124 being substantially at the end 115 of the shoe. The lever is provided with a rounded projection 125 which engages the left hand end 126 of the abutment 117 outside the slot 119. A strut 127 having bifurcated ends extends between the shoe 114 and the lever 123. The bifurcated end 128 of the strut straddles the lever 123 and is engaged in a slot 129 thereof. Similarly, the bifurcated end 130 of the strut 127 straddles the web 131 of the shoe 114 and is received in a slot 132 thereof. A tension spring 133 has one end 134 engaged in an aperture 135 in the web 136 of the shoe 113 and the other end engaged with a bracket 137 secured to the right hand end of the abutment 117.

The brake shoes 113 and 114 are shown in FIG. 2 in their inoperative positions. If the actuator 110 is now operated and the brake drum is turning in a forward direction as indicated by the arrow F, the reactive force due to engagement of the shoe 113 with the drum will act on the lever 123 through the pin 124 and will tend to pivot the lever about the zone of engagement of the projection 125 of the lever with the end 126 of the abutment thus tending to pivot the lever in a clockwise direction. This force will be magnified by the lever 123 and transmitted along the strut 127 to the shoe 114. Although the reactive force on the shoe 114 will act along the strut 127 to the left to try and close up the clearance 122, the magnified force from the shoe 113 acting though the strut 127 overcomes the reactive force of the shoe 114 and thus holds the end 116 of the shoe clear of the base 121 of the slot 120 thus maintaining the clearance 122.

If, however, the drum now rotates in reverse as indicated by the arrow R, the reactive force of the shoe 114 will act on the lever 123 via the strut 127 tending to pivot the lever in an anti-clockwise direction about the pivot 125, 126. The moment of the reactive force of the shoe 113 about the pivot 125, 126 is insufficient to overcome the moment of the reactive force of the shoe 114 acting through the strut 127, and therefore the lever 123 will pivot in an anti-clockwise direction and this will allow the end 116 of the shoe 114 to move towards the base of the slot 121 thus increasing the distance between the ends 111 and 112 of the shoes 113 and 114.

The normal service actuating means for the brake will be such as to limit the stroke of the actuator 110 to such a value that the end 116 is held just clear of the base of the slot 120 although the clearance 122 is substantially eliminated. This, therefore, prevents a high braking torque being generated in reverse. It will be noted, however, that the forward braking torque is not limited by a spring as in the second prior art device referred to, but only by the strength of the various brake parts.

A second actuating means, however, the parking braking means is provided with a greater travel which will operate the actuator 110 so as to cause the end 116 to engage the base 121 of the slot 120 and thus the clearance will be taken up and the shoes 113 and 114 applied to the drum in the normal way. It will be noted that only the normal pull off spring S1 and the spring 133, which also acts as a pull off spring, need be overcome so that the force required will be similar to that of a conventional brake and there is virtually no danger that the clearance 122 will not be taken up when the parking brake is applied.

The first spring 133 acts to bias the lever 123 to the position shown in FIG. 2 in the inoperative position of the brake thus establishing a position of rest for the brake shoes. It also reinforces the reactive force of the shoe 113 during forward braking and opposes the reactive force of the shoe 114 during reverse braking but, in the latter case, has insufficient strength combined with the reactive force of the shoe 114, to prevent the lever 123 pivoting in anti-clockwise direction so the clearance 122 is taken up.

Figure 1:
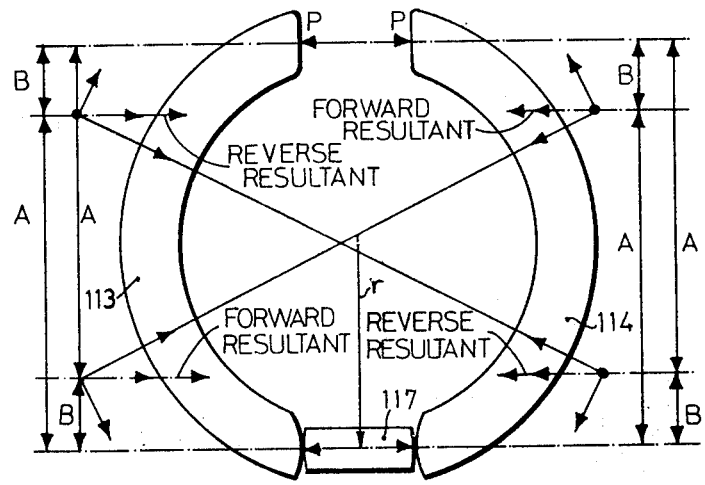
FIG. 1 is a braking force diagram of a leading and trailing shoe brake.

This may be explained further with reference to FIG. 1. In the following analysis it is assumed that the coefficients of friction between each brake lining and the drum are equal and that the lining lenghts are the same so that the distances A and B will be the same for each shoe. The designed maximum actuating force P is also assumed to be the same for each shoe. The resultants of the normal and frictional forces on the shoes when the drum is rotating in a forward direction are referred to in the figure as forward resultants and the similar resultants when the drum is rotating in a reverse direction are referred to as reverse resultants.

The load imposed on the abutment 117 by the leading shoe 113 when the drum is rotating in the forward direction (arrow F in FIG. 2) is to the right in FIG. 1 and is PA/B. The load imposed on the abutment 117 by the trailing shoe 114 is to the left of FIG. 1 and is PB/A.

The braking torque can be represented by the net reaction forces of the abutment on the shoes multiplied by the radial distance $r$ from the drum centre and is thus, acting in a clockwise direction.

$$\left(\frac{PA}{B} - \frac{PB}{A}\right) r$$

The force multiplication provided by the lever 123 and the effect of the spring 133 will be arranged so that when the force on the abutment by the trailing shoe 114 is PB/A and the clearance 122 will just be held.

If the drum now reverses (direction of arrow R in FIG. 2) the abutment force of the shoe 114 on the abutment 117 is limited by the effect of the lever 123 and of the spring 133 to PB/A if the clearance 122 is to be maintained and therefore the actuating force (i.e. the force applied by the actuator 110) is limited to $$\frac{PB}{A} \times \frac{B}{A} = \frac{PB^2}{A^2}$$

if the clearance 122 is to be maintained.

Under these conditions the actuating force on the other shoe is also limited to $PB^2/A^2$ and therefore the abutment force of the shoe 113 on abutment 117 is $$\frac{PB^2}{A^2} \times \frac{B}{A}.$$

The braking torque available in reverse if the clearance 122 is to be maintained therefore is $$\left(\frac{PB}{A} - \frac{PB^3}{A^3}\right) r$$

The range of movement of the service brake operating means is limited to prevent the clearance 122 being reduced by the actuating force so that the maximum force that can be applied to the shoes by the actuator in reverse is $PB^2/A^2$. It follows that the ratio of maximum forward braking torque to maximum reverse braking torque is $$\left(\frac{PA}{B} - \frac{PB}{A}\right) : \left(\frac{PB}{A} - \frac{PB^3}{A^3}\right)$$

i.e. $\frac{A}{B} - \frac{B}{A} : \frac{B}{A}\left(1 - \frac{B^2}{A^2}\right)$

Typical values for A and B are 6 inches and 2 inches which give a ratio of 2.67: 0.29 i.e. 11.1.

When the maximum torque in reverse has been generated the shoe 114 will be moved by the reaction forces to take up the clearance 122. It will be seen from the foregoing that only a low braking torque can be obtained in reverse with the normal service braking operating means.

The parking brake, on the other hand, has sufficient travel to spread the upper ends of the shoes 113 and 114 sufficiently so as to completely eliminate the clearance 122 and so that the end 116 of the shoe 114 engages the bottom 121 of the slot 120. The parking brake will thus apply the shoes in the conventional manner and the braking torque will be equal irrespective of the attempted direction of rotation of the drum.

In an alternative arrangement, shown in dotted lines in FIG. 2, disabling means are provided which are associated with the parking brake means to prevent the lever 123 from pivoting when the parking braking is operated. The lever 123 has an extension 100 which is cooperable with a stop 101 which is pivotable on the brake back plate between its full line position shown in FIG. 2 and its dotted line position. It will be seen that, in the latter position, anti-clockwise movement of the lever 123 which would be accompanied by elimination of the clearance 122 is prevented. The stop 101 is biased to its full line position by a spring 102 and is operated by a lever 103 which is connected by a connection 104 to the parking brake actuating means. When the latter is operated the actuator 110 forces the shoes 113 and 114 apart while at the same time pivoting the stop 101 to its dotted line position to prevent pivoting of the lever 123. The shoes are thus moved to their operative positions although the clearance 122 is held, because the lever 123 can not pivot, and the range of movement required of the parking brake actuating means need be no greater than that of the normal service braking actuating means.

Figure 3:
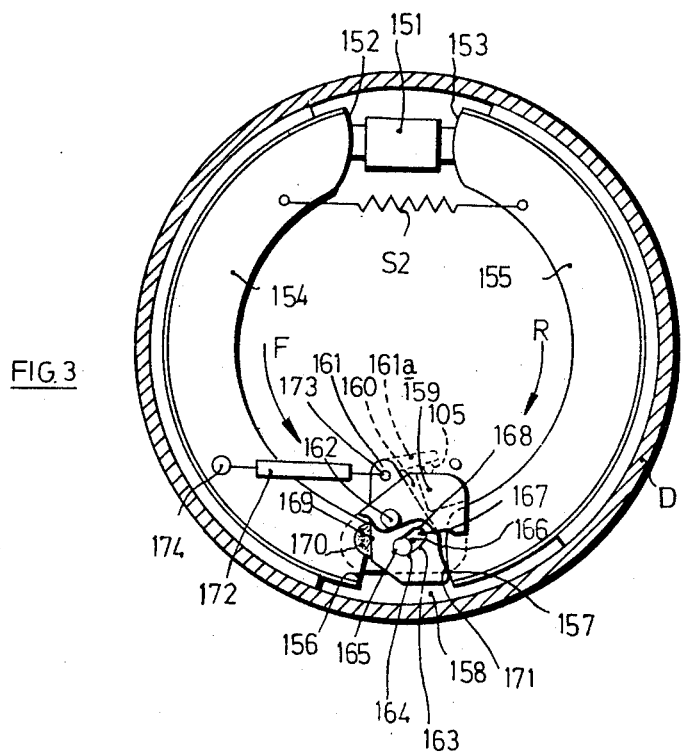
FIG. 3 is an elevation of the drum shoes and torque limitation means of a leading and trailing shoe brake constituting a second embodiment of the invention.

Referring now to FIG. 3 this shows another embodiment of a leading and trailing shoe brake. The brake comprises a floating actuator 151 which acts between the ends 152 and 153 of shoes 154 and 155. The other ends of the shoes 154 and 155 are indicated at 156 and 157 respectively. Located on the back plate 158 of the brake adjacent the ends 156 and 157 is a bracket 159 having a slot 160 therein in which is mounted a lever 161. The lever is of generally triangular shape and is pivoted to the bracket 159 about a fixed pivot axis on a pin 162 which extends across the slot of the bracket. The lever is provided with an elongated slot 163 in which is received a pin 164 which is fixed between the parts of the bracket 159. The pin 164 provides two stops at its opposite sides, these stops being indicated at 165 and 166 and it will be seen that there is a clearance 167 between the stop 166 and the end 168 of the slot 163.

The lever has an edge 169 which is engaged by a die piece 170 received in a recess in the end 156 of the shoe 154. The die piece acts as a wear member which can readily be replaced, moreover, it can be made in a number of different sizes, the appropriate one of which will be selected to compensate for tolerances in the rest of the brake mechanism. The end 157 of the shoe 155 engages an apex 171 of the lever. It will be seen that the radius between the pivot axis of the lever and the engagement of the lever with the shoe 154 is less than the radius between the pivot axis of the lever and the apex 171 where the shoe 155 engages the lever. A biasing spring 172 is engaged with the lever at 173 and in an aperture 174 in the shoe 154. In the inoperative position of the brake as shown in FIG. 3 the spring 172 urges the lever 161 in an anti-clockwise direction about its pivot pin 162 so that the lever engages the stop constituted by the side 165 of the pin 164.

When the drum is rotating in a forward direction as indicated by the arrow F, the reactive force of the shoe 154 plus the action of the spring 172 on the lever 61 holds the lever in the position shown in FIG. 3 thus maintaining the clearance 167 although the reactive force of the shoe 155 is tending to pivot the lever 161 in a clockwise direction to reduce the clearance. When the drum rotates in a reverse direction, however, as indicated by the arrow R, the reactive force of the shoe 155 acting at a greater radius from the pivot 162 of the lever 161, is able to overcome the reactive force of the shoe 154 and the action of the spring 172 and to pivot the lever in a clockwise direction thus substantially eliminating the clearance 167. As a result of pivoting of the lever 161, the ends 156 and 157 of the shoes move closer together so that the ends 152 and 153 move further apart.

If the travel of the actuator 151 is limited to a value which will substantially eliminate the clearance 167 when the drum is rotating in reverse, but no more, then it is not possible to obtain high braking torque in reverse. The limited travel of the actuator, however, when the drum is rotating in a forward direction is sufficient to obtain the necessary braking force. If it is the normal service actuator which has a limited travel then, as explained above, a parking brake actuator can have a greater travel and when operated can move the shoe 155 so as to completely take up the clearance 167 and so the end 168 of the slot abuts the slot 166 so that full braking torque can be obtained.

The brake is thus arranged so that there is a clearance i.e. the clearance 167 in the torque limitation means during forward travel, this clearance is substantially eliminated during reverse travel thus preventing generation of high torque in reverse. It will be noted that there is no spring which serves to limit the torque available during forward travel. On the other hand, high braking torque can be obtained by a parking brake in the normal way. Only the normal pull off spring S2 and the spring 172 have to be overcome to apply the parking brake so that an effort similar to that in a conventional brake is all that is required to apply the parking brake.

In an alternative construction, a pivoted stop 105 may be arranged to cooperate with an extension 161a of the lever 161 as shown in dotted lines in FIG. 3. When the stop is in the position shown in dotted lines it prevents the lever 161 rotating in an anti-clockwise direction to take up the clearance 167. The stop 105 is connected to the parking braking means and moved to its dotted position when such means are operated. The arrangement is therefore similar to that of FIG. 2 and the parking braking means need have no greater range of movement than the service braking means.

Figure 4:
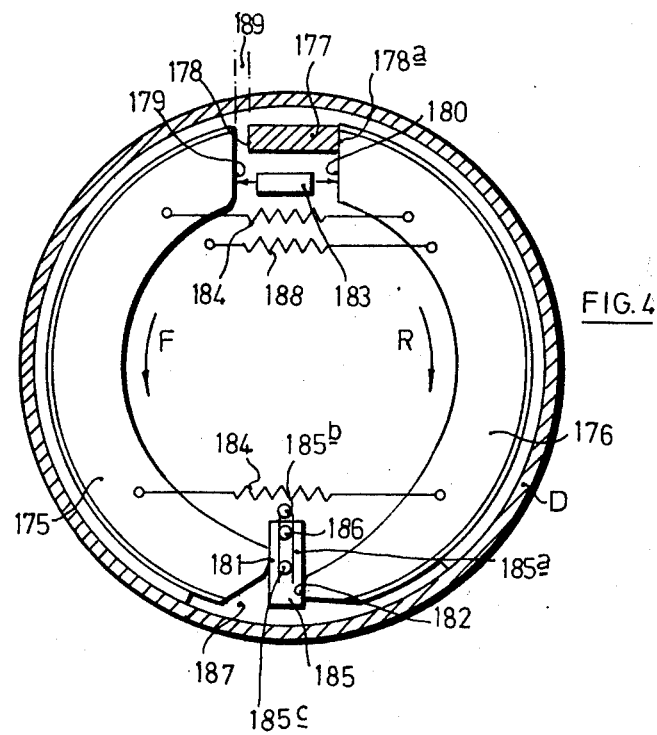
FIG. 4 is a diagram illustrating a duo-servo brake constituting a third embodiment of the invention.

Referring now to FIG. 4 this shows a duo-servo brake embodying the invention. The brake has two shoes 175 and 176 and an abutment block 177 which provides two abutments 178 and 178a at opposite ends thereof. The one ends of the shoes 175 and 176 are indicated at 179 and 180 respectively and the other ends of the shoes are indicated at 181 and 182, respectively. A floating actuator 183 acts between the ends 179 and 180 and the normal pull-off springs of the brake are indicated at 184.

Between the ends 181 and 182 of the shoes is a lever 185 which is pivoted at 186 about a fixed pivot axis on the brake backplate 187. The lever 185 is biased to a central position by a hair pin spring 185a which engages a fixed pin 185b and a pin 185c on the lever. It will be noted that the radius from the pivot 186 at which the end 181 engages the lever is less than the radius from the pivot 186 at which the end 182 engages the lever 185. There is a bias spring 188 which acts between the shoe 176 and the brake backplate to bias the shoe end 180 into engagement with the abutment 178a. As shown, there is a clearance 189 between the shoe end 179 and the abutment 178.

During forward rotation of the drum D in the direction of the arrow F, the shoe 180 engages the abutment 178a. If the actuating force applied to the end 179 is considered to be a unit force then there will be three units of force applied by the end 181 to the lever 185 tending to rotate this in an anti-clockwise direction. The lever 185 in turn will apply a single unit of force to the end 182, since the lever 185 will be arranged so that the radius between the pivot 186 and the end 182 is three times the radius between the pivot 186 and the end 181. There will therefore be three units of force approximately between the end 180 and abutment 178a.

If now the drum rotates in reverse, the shoes will tend to move circumferentially in the direction of the arrow R with the drum and the clearance 189 will be taken up. If the circumferential value of the clearance is considered to be $x$ then the end 179 of the shoe 175 will move by a distance $x$ so that it engages the abutment and the end 181 will similarly move by a distance $x$. The end 182 will move by a distance $3x$ and therefore the end 180 will also move by a distance $3x$. It follows that the distance between the ends 179 and 180 has been increased by a distance $2x$. The obtaining of a high torque in reverse can thus be avoided if the travel of the actuator 183 is such that, although it has sufficient travel to obtain full braking torque when the drum is rotating in the forward direction, it has insufficient travel to obtain a high braking torque when the distance between the ends 179 and 180 has increased by $2x$ upon reverse rotation of the drum.

The biasing spring 188 together with the pull-off springs 184 maintain the clearance 189 and the end 180 in engagement with the abutment 178a during the time that the shoes are in their operative positions and the strength of the spring 188 is sufficient to ensure that the end 180 remains in engagement with the abutment 178a during the initial stages of the braking when the drum is rotating in the forward direction indicated by the arrow F.

To obtain full braking torque for parking, the parking braking means will initially, due to the lever 185, cause the shoe end 179 to engage the abutment 178 and the actuation will then cause the shoes to come into engagement with the drum in the normal way.

If desired a stop to prevent rotation of the lever 185 in an anti-clockwise direction when the parking braking is operated may be provided and it will have a similar effect to the stops 101 and 105 of FIGS. 2 and 3.

It will be seen that the invention provides a brake in which one can obtain a high braking torque in one direction of rotation but, by limiting the travel of the actuator, prevent the obtaining of a high torque in reverse rotation. Where the brake is applied to a trailer, which is its primary purpose, the trailer draw bar will, if the trailer is reversed, come up against an abutment. Preferably, the clearance in the brake actuating mechanism will be taken up before the draw bar comes to the limit of its travel. While it is not essential, if one allows the draw bar to come to the end of its travel before the clearance in the brake actuating means has been taken up there will be unnecessary lost motion to be taken up upon application of the hand brake.

The brake of the invention has two advantages over those shown in the prior art. Firstly, the high braking torque available when the drum is rotating in said one direction is not limited by the strength of a spring but by the strength of the mechanism. Secondly it is possible fully to apply the brake when the drum is stationary more easily than in the previous constructions and there is thus less chance of a parking brake being insufficiently applied so that the vehicle could move in reverse with consequent diminution in braking torque.

I claim:

1. A drum brake comprising a drum, two shoes mounted within the drum for movement between operative and inoperative positions, spring means biasing the shoes to their inoperative positions, a shoe actuator interposed between adjacent one ends of the two shoes, a shoe abutment and torque limitation means arranged to provide a clearance having a predetermined value when the shoes are in their operative positions and the drum is rotating in one direction and to eliminate or substantially to eliminate said clearance in response to the reactive forces generated by the shoes due to their engagement with the drum when the shoes are in their operative positions and the drum is rotating in the opposite direction thereby producing a lower torque between said drum and said shoes than when said drum is rotating in said one direction so that, when the drum is rotating in said opposite direction, a greater movement apart is required of said one ends of the shoes by said actuator from the positions said ends occupy when the shoes are in their inoperative positions to obtain a given braking torque than is required to obtain said braking torque when the drum is rotating in the one direction and the torque limitation means being arranged so that, with the drum rotating in either of said directions and with the shoes in their operative positions, said reactive force generated by one of the shoes acts to tend to reduce said clearance, the torque limitation means comprising a lever mounted to pivot with respect to a fixed part of the brake and being connected, with the other ends of the shoes, the engagement of the lever with said shoe ends being at different radii about the lever pivot for the two shoe ends, the lever being biased to a rest position which it takes up when the shoes are in their inoperative positions, whereas when the shoes are in their operative positions said reactive forces (1) hold the lever substantially in its rest position when the drum is rotating in said one direction and (2) pivot the lever to eliminate or substantially eliminate the clearance when the drum is rotating in said opposite direction.

2. A brake according to claim 1 wherein the shoes act respectively in a leading sense and in a trailing sense and wherein the lever engages the abutment, the zone of engagement between the lever and the abutment providing the pivot of the lever and the clearance being provided between one of the shoes and the abutment;

and wherein said radius about the lever pivot of the engagement of the other end of said one shoe is greater than the radius about the lever pivot of engagement of the other end of the other shoe.

3. A brake according to claim 2 wherein the other end of said one shoe engages the lever through connecting means in the form of a strut.

4. A brake according to claim 1 wherein the shoes act respectively in a leading sense and in a trailing sense, and wherein the lever is pivoted about a fixed pivot axis on a fixed part of the brake, the lever being held against a first stop by resilient means and engagement with one of said shoes when the drum is rotating in said one direction, the said clearance being between the lever and a second stop; and wherein the radius about the lever pivot axis of the engagement of said other end of said one shoe is less than the radius about the lever pivot axis of the engagement of said other end of the other shoe.

5. A brake according to claim 4 wherein the stops are provided by opposite sides of a pin which is engaged in a slot in the lever.

6. A brake according to claim 1 arranged as a duo-servo brake and wherein the lever is pivoted about a fixed pivot axis on a fixed part of the brake; said clearance being provided between one of said shoes and the abutment and in that the radius about the lever pivot axis of engagement of said other end of the one shoe is less than the radius about said lever pivot axis of engagement of the other end of the other shoe.

7. A brake according to claim 1 characterised by the provision of disabling means operable to prevent pivotal movement of the lever to reduce the clearance.

8. The combination of a brake according to claim 7 with first and second brake operating means operatively connected to the actuator, the first such means having sufficient travel to obtain a high braking torque when said clearance has its predetermined value but only sufficient travel to obtain a low braking torque when the clearance has been substantially eliminated, the second such means being associated with said disabling means to operate the same to prevent pivotal movement of the lever upon operation of the brake by the second such means.

* * * * *